United States Patent
Tasoujian et al.

(10) Patent No.: US 12,546,203 B2
(45) Date of Patent: Feb. 10, 2026

(54) SYSTEMS AND METHODS TO PERFORM AUTOMATED DRILLING

(71) Applicant: Halliburton Energy Services, Inc., Houston, TX (US)

(72) Inventors: Shahin Tasoujian, Cupertino, CA (US); Yuanyan Chen, Houston, TX (US); Khunsa Hisham, Houston, TX (US); Vy Pho, Houston, TX (US); Ketan C. Bhaidasna, Houston, TX (US); Robert P. Darbe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 364 days.

(21) Appl. No.: 18/136,773

(22) Filed: Apr. 19, 2023

(65) Prior Publication Data
US 2024/0352843 A1    Oct. 24, 2024

(51) Int. Cl.
E21B 44/00    (2006.01)
E21B 7/04    (2006.01)
E21B 47/022    (2012.01)

(52) U.S. Cl.
CPC .............. *E21B 44/00* (2013.01); *E21B 7/04* (2013.01); *E21B 47/022* (2013.01); *E21B 2200/20* (2020.05)

(58) Field of Classification Search
CPC .......... E21B 44/00; E21B 7/04; E21B 47/022; E21B 2200/20; E21B 7/06
See application file for complete search history.

(56) References Cited

U.S. PATENT DOCUMENTS

| | | | |
|---|---|---|---|
| 9,970,285 B2 | 5/2018 | Sugiura | |
| 10,024,151 B2 | 7/2018 | Dykstra et al. | |
| 2009/0000823 A1 | 1/2009 | Pirovolou | |
| 2012/0247833 A1* | 10/2012 | Ekseth | E21B 7/067 |
| | | | 175/45 |
| 2013/0138254 A1 | 5/2013 | Seals et al. | |
| 2014/0196950 A1 | 7/2014 | Bayliss | |
| 2016/0160628 A1 | 6/2016 | Sugiura et al. | |
| 2017/0183953 A1 | 6/2017 | Harris et al. | |
| 2018/0066475 A1 | 3/2018 | Vadali et al. | |

(Continued)

OTHER PUBLICATIONS

International Search Report & Written Opinion in PCT/US2023/019282 mailed Jan. 12, 2024.

*Primary Examiner* — Scott T Baderman
*Assistant Examiner* — Ayisha Yahya Yonis
(74) *Attorney, Agent, or Firm* — DeLizio, Peacock, Lewin & Guerra LLP (57) ABSTRACT

The disclosed embodiments include systems and methods to perform automated drilling for both surface and downhole control. The method includes receiving a curvature reference set point, and calculating a curvature error with respect to the curvature reference set point. The method also includes providing the curvature error to a linear matrix inequalities based robust linear quadratic regulator controller. The method further includes determining one or more steering commands based on an output of the linear matrix inequalities based robust linear quadratic regulator controller. The method further includes providing the one or more steering commands to be implemented by a drilling tool during a drilling operation.

20 Claims, 6 Drawing Sheets

(56) References Cited

U.S. PATENT DOCUMENTS

| | | |
|---|---|---|
| 2020/0284135 A1* | 9/2020 | Benson ................. E21B 44/005 |
| 2021/0164293 A1 | 6/2021 | Zhao et al. |
| 2021/0238926 A1 | 8/2021 | Zalluhoglu et al. |
| 2021/0363828 A1 | 11/2021 | Zalluhoglu et al. |
| 2022/0120170 A1 | 4/2022 | Marck et al. |
| 2023/0023709 A1* | 1/2023 | Jamieson ................ E21B 44/06 |
| 2023/0151696 A1* | 5/2023 | Weideman .............. E21B 7/046 |
| | | 175/27 |
| 2023/0272704 A1* | 8/2023 | Demirer ................... E21B 7/04 |

\* cited by examiner

SYSTEMS AND METHODS TO PERFORM AUTOMATED DRILLING

BACKGROUND

The present disclosure relates generally to systems and methods to perform automated drilling.

The process of drilling a wellbore in a geological formation includes directional drilling sections to guide the wellbore towards a predetermined target. Directional drilling comprises controlling the attitude (inclination and azimuth) and/or the position (true vertical depth, north/south, east/west) of the wellbore using surface and downhole tools to guide the wellbore along a planned well path (i.e., well plan) towards a predetermined target. Directional drilling is controlled to maintain the wellbore trajectory within range of the well plan to avoid nonproductive drilling time and inaccurate wellbore placement in the reservoir. However, the drilling the curve section of the wellbore is difficult to automate and is typically performed manually by a directional driller on the rig surface, which is prone to human error, inconsistencies, delays and inefficiency.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to perform automated drilling. More particularly, the present disclosure relates to systems and methods to automate the drilling process of a curve section of a borehole by using a robust, reliable, and model-based curvature cruise controller. In that regard, a wellbore may have vertical, tangent, or horizontal sections that are connected by a curve section. When drilling the curve section, the tool face orientation of the drilling bottom hole assembly ("BHA") should be oriented correctly for the wellbore path/trajectory to adhere to a planned wellbore trajectory.

A curvature cruise controller is formed to automatically maintain a specified target curvature to drill the curve section of a wellbore. Target curvature and attitude set points are input to the curvature cruise control algorithm. The curvature cruise controller may use a robust linear quadratic regulator ("RLQR") controller or other model-based controllers to regulate the instantaneous wellbore curvature to achieve the specified curvature setpoint while attempting to reach a desired attitude setpoint once the curve section is complete. More particularly, a model-based RLQR control system is formulated as Linear Matrix Inequalities (LMIs) to maintain the borehole curvature within a user-specified desired range (curvature setpoints). In some embodiments, the setpoint for a given curvature (e.g., build/drop and walk/turn rates) are time varying and is not limited to a fixed value. In some embodiments, the curvature cruise controller receives attitude (e.g., inclination and azimuth) measurement data (MWD) from at least two separately placed sensors (with known distance on BHA) to compute steering commands (steering ratio (Duty Cycle or DC) and steering direction (Toolface or TF)). In some embodiments, the borehole evolution dynamics are described using a first-order differential equations model representation. In one or more of such embodiments, the model parameters (particularly, $\tau$ system dynamics' time constant, and $\kappa_{ss}$ maximum curvature generation capability of the tool) are selected based on the RSS type, BHA geometry, drilling operation parameters, etc. In one or more of such embodiments, the model parameters are considered to have lower and upper bounds for each parameter used for robust control design. In some embodiments, the RLQR controller receives both attitude and curvature setpoints as inputs (e.g., inclination and build rate setpoints) and attempts to automatically achieve both until it receives updated setpoints. In some embodiments, two RLQR controllers, such as a curve-hold controller and an attitude-hold controller, are utilized in conjunction to improve the performance compared to a single controller. In one or more of such embodiments, the curvature-hold controller is configured to maintain the specified target curvature, and once the wellbore attitude reaches the setpoint, the curvature-hold controller is configured to automatically switch to the attitude hold controller (i.e., curvature setpoint drops to zero, and no more curvature needed to be drilled).

The RLQR controller generates steering commands (e.g., steering direction tool-face and steering ratio duty cycle) to be implemented by a drilling tool. During drilling of the curve section, the curvature cruise controller receives attitude feedback and calculates curvature and attitude errors with respect to specified curvature and attitude setpoints. Furthermore, the RLQR controller utilizes a wellbore propagation model, model parameters uncertainties and drilling operation parameters feedback to update control gains and to compute steering commands. The steering commands are used to facilitate maintaining the wellbore curvature with respect to the specified setpoints. In some embodiments, the operations performed herein are also performed (or iteratively performed) to tune the RLQR controller based on one or more drilling operation parameters. In some embodiments, the operations performed herein are also performed (or iteratively performed) to be robust against model parameters uncertainty, mathematical model mismatches, and unmodeled dynamic disturbances. Additional descriptions of the foregoing systems and methods to perform automated drilling are described in the paragraphs below and are illustrated in FIGS. 1-6.

Figure 1:
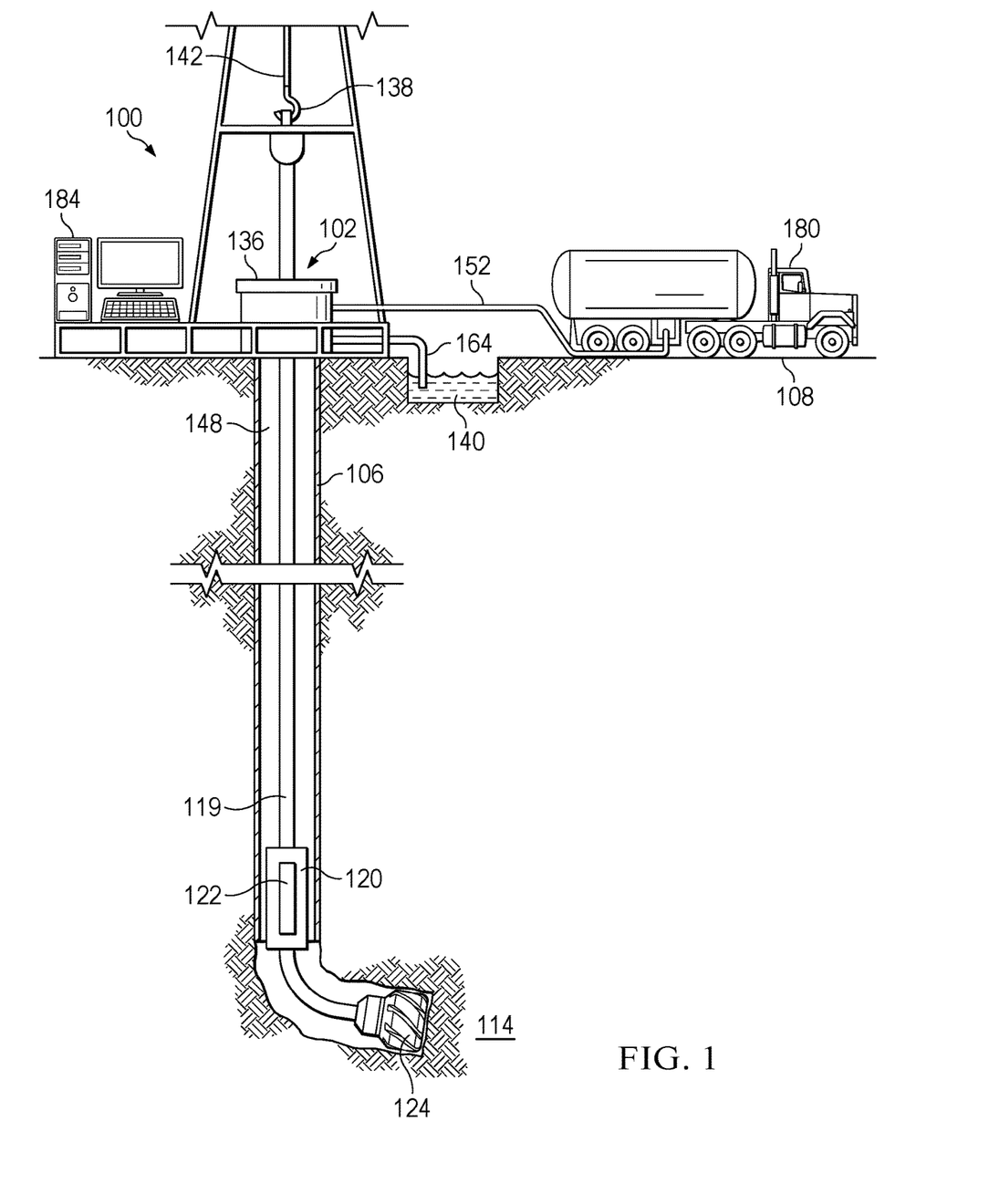
FIG. 1 is a schematic, side view of a drilling environment in which an automated drilling system is deployed.

Now turning to the figures, FIG. 1 is a schematic, side view of a drilling environment 100 in which an automated drilling system 122 is deployed. In the embodiment of FIG. 1, a well 102 having a wellbore 106 extends from a surface 108 of well 102 to or through a formation 114. A hook 138, cable 142, traveling block (not shown), and hoist (not shown) are provided to lower a conveyance 119 down wellbore 106 of well 102 or to lift conveyance 119 up from wellbore 106 of well 102. In one or more embodiments, conveyance 119 may be a drill string, drill pipe, wireline, slickline, coiled tubing, production tubing, downhole tractor or another type of conveyance operable to be deployed in wellbore 106. At a wellhead 136, an inlet conduit 152 is coupled to a fluid source 180 to provide fluids, such as drilling fluids, downhole. In the embodiment of FIG. 1, conveyance 119 has an internal cavity that provides a fluid flow path from surface 108 to a downhole location.

In some embodiments, the fluids travel down conveyance 119 and exit conveyance 119 at a drill bit 124. The fluids flow back toward surface 108 through a wellbore annulus 148 and exit the wellbore annulus 148 via an outlet conduit 164 where the fluids are captured in container 140. In some embodiments, conveyance 119 also provides telemetry of data indicative of one or more parameters of the drilling operation and well 102. Examples of parameters of the drilling operation and well 102 include, but are not limited to, an azimuth of well 102, a dip angle of well 102, a frictional force experienced by conveyances and tools used during the drilling operation, the diameter of wellbore 106, the type of lubricity used for the drilling operation, presence of the cuttings bed in wellbore 106, presence of the pack-off, the dogleg in wellbore 106, the keyseat in wellbore 106, the degree of curvature of wellbore 106, the tortuosity of wellbore 106, the viscous effect of wellbore 106, the diameter of wellbore 106, the asperity between the conveyance used in the drilling operation and wellbore 106, as well as other parameters related to the drilling operation or well 102.

In the embodiment of FIG. 1, a BHA 120 having automated drilling system 122 is also deployed downhole via conveyance 119. Automated drilling system 122 includes one or more processors configured to receive a curvature reference set point, calculate a curvature error with respect to the set point, provide the curvature error to a LMI-based RLQR controller, such as LMI-based RLQR controller 204 of FIG. 2, determine one or more steering commands based on an output of the LMI-based RLQR controller, and provide the one or more steering commands to be implemented by the drilling tool during a drilling operation. In some embodiments, automated drilling system 122 includes an attitude-hold controller and a curvature-hold controller, both of which are LMI-based RLQR. In the embodiment of FIG. 1, both the attitude-hold controller and curvature-hold cruise controller are positioned along BHA 120. In some embodiments, the LMI-based RLQR controller is positioned elsewhere downhole, or on the surface 108. In some embodiments, automated drilling system 122 includes one or more processors and additional controllers that are configured to perform the operations described herein. Additional operations performed by automated drilling system 122 is provided herein and illustrated in at least FIGS. 2-6.

In some embodiments, sensors or transducers (not shown) are located at the lower end of conveyance 119. In one or more embodiments, sensors are built into a cylindrical drill collar that is positioned close to drill bit 124. While drilling is in progress, these sensors continuously or intermittently determine one or more signals which represents the drilling operation of well 102, and transmit the information to a surface detector by one or more telemetry techniques including, but not limited to, mud pulse telemetry, acoustic telemetry, wired pipe-based telemetry, and electromagnetic wave telemetry. In one or more embodiments, where a mud-pulse telemetry system is deployed in wellbore 106 to provide telemetry, telemetry information is transmitted by adjusting the timing or frequency of viable pressure pulses in the drilling fluid that is circulated through conveyance 119 during drilling operations. In one or more embodiments, an acoustic telemetry system that transmits data via vibrations in the tubing wall of conveyance 119 is deployed in wellbore 106 to provide telemetry. More particularly, the vibrations are generated by an acoustic transmitter (not shown) mounted on conveyance 119 and propagated along conveyance 119 to an acoustic receiver (not shown) also mounted on conveyance 119. In one or more embodiments, an electromagnetic wave telemetry system that transmits data using current flows induced in conveyance 119 is deployed in wellbore 106 to provide telemetry. Additional types of telemetry systems may also be deployed in wellbore 106 to transmit data from tools (not shown) and other downhole components to a surface-based system 184. In the embodiment of FIG. 1, surface-based system 184 is a component of automated drilling system 122, and is configured to store offline data, including predetermined gains tables of certain control gains and other calculations. Further, surface-based system 184 is configured to provide data downhole via telemetry. In some embodiments, automated drilling system 122 includes or is communicatively connected to a cloud-based system that stores offline data and is configured to retrieve the offline data from the cloud-based system. In some embodiments, offline data, including predetermined gains tables are stored downhole. In some embodiments, some components of automated drilling system 122 are stored on surface 108 and other components of automated drilling system 122 are located at one or more downhole locations. In that regard, in some embodiments, certain operations described herein are performed by surface-based components of automated drilling system 122 and other operations are performed by components of automated drilling system 122 that are located downhole. In other embodiments, all of the operations described herein are performed by surface-based components of automated drilling system 122. Still in other embodiments, all of the operations described herein are performed by components of automated drilling system 122 that are located downhole.

Figure 2:
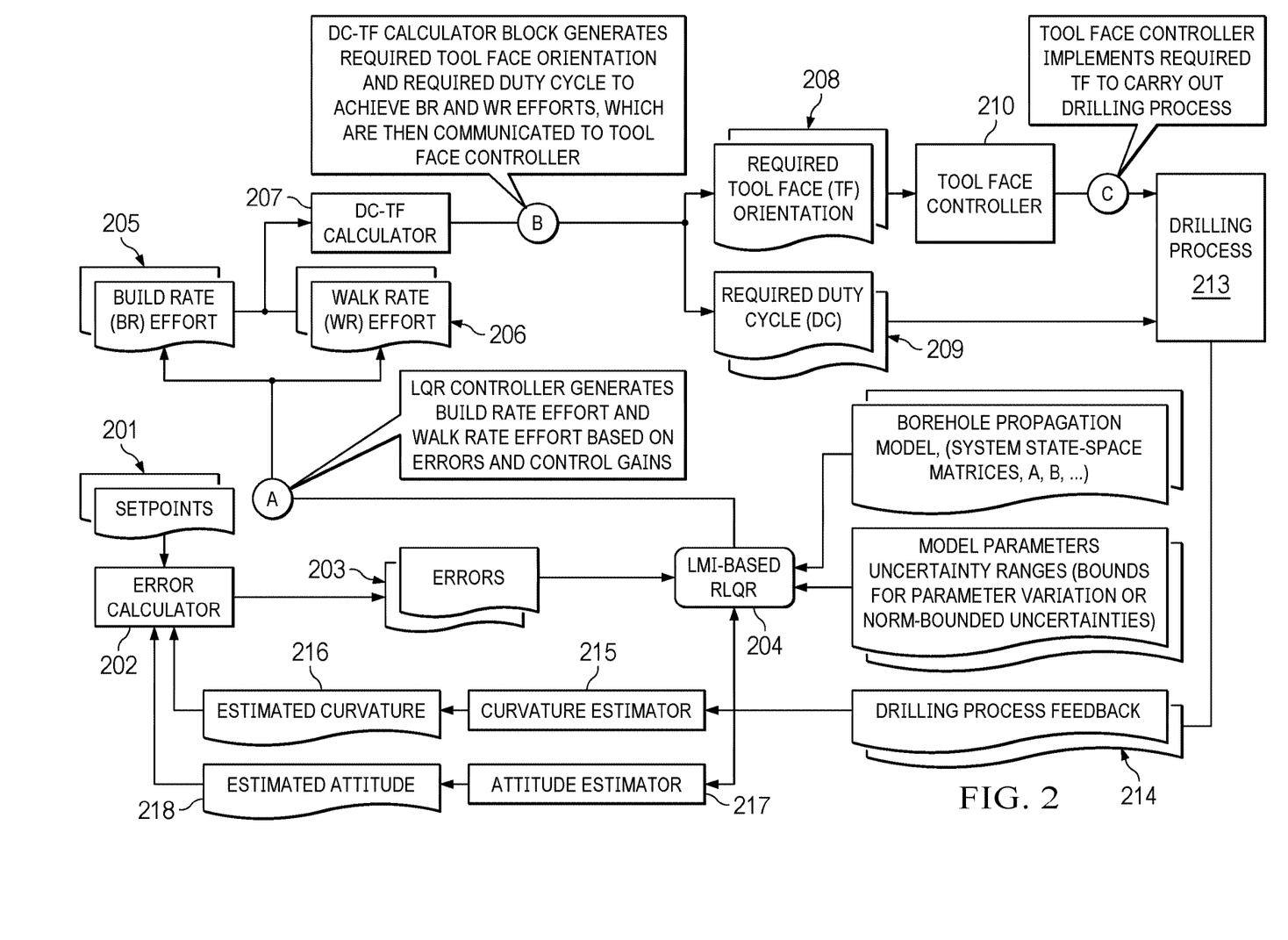
FIG. 2 is a conceptual diagram of a RLQR controller of the automated drilling system of FIG. 1 and configured to generate steering commands to be implemented by a drilling tool.

FIG. 2 is a conceptual diagram of a RLQR controller generating steering commands to be implemented by a drilling tool. Steering commands are generated by the control input of the RLQR controller 204. Detailed descriptions of the RLQR controller 204 and other similar RLQR controllers are provided in the paragraphs herein. FIG. 2 is annotated with letters A-C to indicate states of operation. These letters represent stages of operations, each of which is one or multiple operations. Although these stages are ordered for this example, the stages illustrate one example to aid in understanding this disclosure and should not be used to limit the claims. Subject matter falling within the scope of the claims may vary with respect to the order and some of the operations. 15

At stage A, the RLQR controller 204 generates build rate ("BR") effort 205 and/or walk rate ("WR") effort 206 based on errors 203 and control gain vectors corresponding to drilling process feedback 214. Errors 203, calculated by error calculator 202, are based on setpoints 201 (e.g., curvature and attitude setpoints), estimated curvature 216 (based on attitude measurements feedback 214 and by curvature estimator 215) by estimated attitude 218 (based on attitude measurements in drilling process feedback 214 by attitude estimator 217) at different sensor locations. Build rate effort 205 comprises the build rate (i.e., the rate at which the wellbore builds in the vertical plane) required by the BHA to minimize errors 203 at current drilling operation parameter measurements, such as ROP and WOB. Likewise, walk rate effort 206 comprises the walk rate (i.e., the rate at which the wellbore builds in the horizontal plane) required by BHA to minimize errors 203 at current drilling operation parameter measurements.

At stage B, DC-TF Calculator 207 generates required tool face orientation 208 and required duty cycle 209 based on build rate effort 205 and/or walk rate effort 206. Required tool face orientation 208 comprises the angle in which the drill bit faces with respect to the BHA. The required duty cycle/steering ratio 209 comprises the amount of steering force needed from the BHA. Together, the required tool face orientation and duty cycle aim to achieve the build rate and walk rate efforts to minimize errors 203. In some embodiments, the duty cycle is represented as a percentage of the maximum steering capability of the tool. For example, 100% duty cycle would mean full steering capabilities of the BHA are needed to achieve the build rate and walk rate efforts. Required tool face orientation 208 is communicated to tool face controller 210. In some embodiments, tool face controller 210 is located on the BHA. In some embodiments, required duty cycle 209 is communicated directly to the drilling process 213. The required tool face orientation 208 and required duty cycle 209 are downlinked to the tool face controller 210 and drilling process 213, respectively.

At stage C, tool face controller 210 implements the steering commands to carry out the drilling process 213. Drilling process 213 generates drilling process feedback 214 (i.e., drilling operation parameters feedback and attitude feedback) to assist in the next cycle of steering commands generation.

Figure 3:
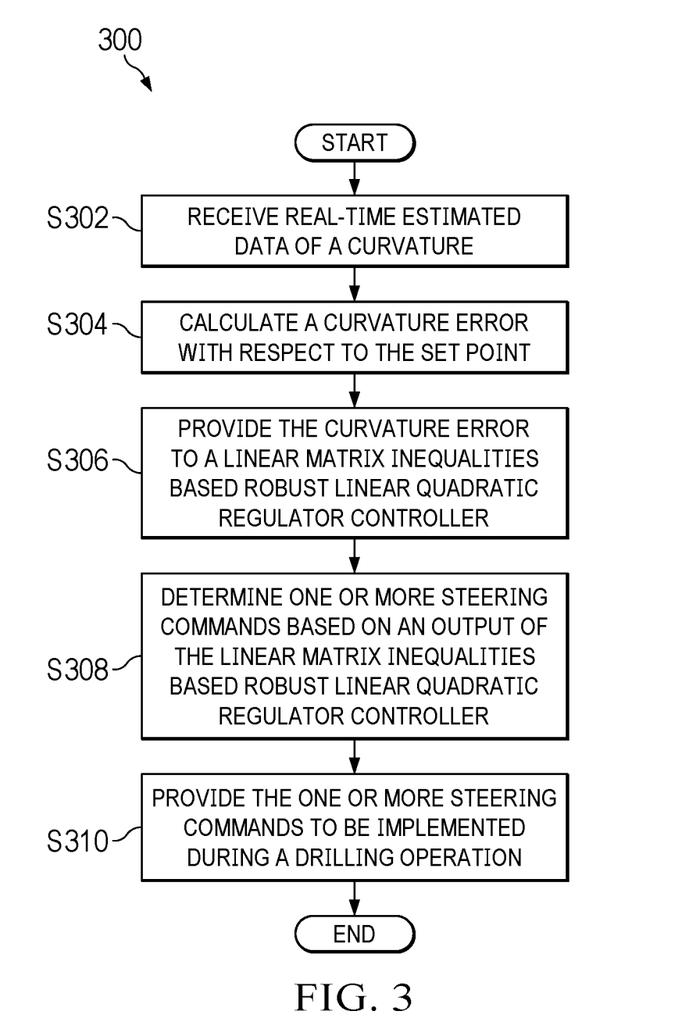
FIG. 3 is a flowchart of a process to perform automated drilling.

FIG. 3 is a flow chart of a process 300 to perform automated drilling. Although the operations in process 300 are shown in a particular sequence, certain operations may be performed in different sequences or at the same time where feasible. In some embodiments, process 300 is performed by automated drilling system 122 of FIG. 1.

At block S302, a curvature reference set point, is received. In some embodiments, the set point is a constant. In some embodiments, the set point varies along a wellbore's curve section. In some embodiments, the setpoint is one of a build rate, walk rate, inclination, and azimuth set points. As block S304, a curvature error with respect to the set point is calculated. At block S306, the curvature error is provided to an LMI-based RLQR controller. The RLQR controller is a model-based technique in which the linear state-space dynamic model representation is considered as follows:

$$\dot{x}(t) = Ax(t) + B_1 u(t) + B_2 w(t) \quad (1)$$

$$z(t) = Cx(t) + D_1 u(t) + D_2 w(t)$$

$$x(0) = x_0$$

where $x(t) \in \mathbb{R}^n$ is the system state vector, $u(t) \in \mathbb{R}^{n_u}$ is the control input vector, $w(t) \in \mathbb{R}^{n_w}$ denotes the exogenous input vector with bounded $\mathcal{L}_2$-norm, $z(t) \in \mathbb{R}^{n_z}$ stands for the vector of controlled outputs and A, $B_1$, $B_2$, C, $D_1$, $D_2$ are system's state-space real-valued matrices.

$$C = Q^{\frac{1}{2}},$$

$$D_1 = R^{\frac{1}{2}},$$

$D_2=0$, where Q and R are positive-definite real matrices being utilized as penalty factors of the performance index. Indeed, Q and R denote the importance of the system states and control inputs, respectively.

At block S308, one or more steering commands to be implemented are determined based on an output of the LMI-based RLQR controller. In some embodiments, one or more uncertain model parameters are inputted to the LMI-based RLQR controller to determine one or more steering commands. In the case of uncertain systems, the state-space representation is (polytopic representation):

$$\dot{x}(t) = A(\lambda(t))x(t) + B_1(\lambda(t))u(t) + B_2(\lambda(t))w(t) \quad (2)$$

$$z(t) = Cx(t) + D_1 u(t) + D_2 w(t)$$

$$x(0) = x_0$$

where state-space matrices of the system, A, $B_1$, $B_2$, are considered to be uncertain and belong to a compact convex polytopic set (polytope) as follows:

$$\mathfrak{B} := [A_1, B_{1,1}, B_{2,1}] \times \ldots \times [A_\ell, B_{1,\ell}, B_{2,\ell}] \quad (3)$$

where $\ell$ is the number of parameters in the system and the polytope is characterized in terms of the set of its vertices shown as follows:

$$(A_i, B_{1,i}, B_{2,i}) \in vert[\mathfrak{B}] \quad (4)$$

and consequently, system's uncertain state-space matrices is shown as follows:

$$(A, B_1, B_2) = \sum_{i=1}^{N} \lambda_i (A_i, B_{1,i}, B_{2,i}) \quad (5)$$

where $N=2^\ell$ is the number of vertices and $\lambda \in \Lambda_N$ lies in the N-unit simplex shown as follows:

$$\Lambda_N := \left\{ \lambda \in \mathbb{R}_+^N : \sum_{i=1}^{N} \lambda_i = 1 \right\} \quad (6)$$

In some embodiments, a feedback of a drilling operation is received, and is inputted to the LMI-based RLQR controller to determine one or more steering commands. In some embodiments, a control input of a RLQR controller takes the full-state feedback form as follows:

$$u(t) = -Kx(t) \tag{7}$$

where K is the control gain vector and will be designed optimally based on design objectives and performance requirements. In some embodiments, the full-state feedback information (x(t)) used by the designed RLQR controller in (7), is either measured directly or estimated/observed. Moreover, by designing the control gain vector K, the RLQR controller reduces or minimizes the quadratic cost function (performance index):

$$J = \int_0^\infty \left( x^T(t)Qx(t) + u^T(t)Ru(t) \right) dt \tag{8}$$

In the in embodiment of FIG. 3, a Lyapunov method is utilized to derive sufficient conditions formulated in the convex linear matrix inequality (LMI) constraint framework for the robust stabilization of the considered system (1). In the embodiment of FIG. 3, the RLQR controller u(t) is configured to provide input-output stability (asymptotic stability) of the closed-loop system in the presence of model parameter uncertainty and disturbance, and to reduce or minimize the worst-case amplification of the controlled output (desired output) z to a disturbance signal w, ($\mathcal{H}_\infty$-norm of disturbance/output operator, $T_{zw}$) given by $$\min \|T_{zw}\|_{\mathcal{H}_\infty} = \min \sup_{\|w\| \neq 0, w \in \mathcal{L}_2} \frac{\|z\|_2}{\|w\|_2} \tag{9}$$

In the embodiment of FIG. 3, instead of solving for the optimal objective (9), the upper bound suboptimal problem is solved as:

$$\|z\|_2 < \gamma \|w\|_2 \tag{10}$$

where $\gamma$ is a positive scalar.

The following theorem provides RLQR controller design results which lead to sufficient conditions formulated as convex LMIs for the synthesis of a full-state feedback controller to meet the control design objectives, including closed-loop asymptotic stability and a specified level of disturbance attenuation performance ($\mathcal{H}_\infty$ performance), (9) in the presence of parameter uncertainties, model mismatches and disturbances.

Theorem 1. Given Q and R as positive definite real matrices being utilized as penalty factors of the RLQR controller, and a positive scalar $\alpha$ as a minimum decay rate, there exists a state-feedback controller of the form (7) to asymptotically stabilize the uncertain system (2) and satisfy the $\mathcal{H}_\infty$ performance level (9) with a positive scalar $\gamma$, if these exist a positive definite matrix $X \in \mathbb{S}_{++}^n$, a constant matrix $Z \in \mathbb{R}^{n_u \times n}$, and a minimized positive scalar $\mu$ (upper bound on output energy/cost function, J, in (8)), such that the following conditions are satisfied for i=1, ..., N:

$$\min \mu$$

subject to $$\begin{bmatrix} A_i X + X A_i^T + B_{1,i} Z + B_{1,i}^T Z^T + 2\alpha X & * & * & * \\ \mu B_{2,i}^T & -\mu \gamma^2 I & * & * \\ X & 0 & -\mu Q^{-1} & * \\ Z & 0 & 0 & -\mu R^{-1} \end{bmatrix} < \tag{11-a}$$

$$0,$$

$$\begin{bmatrix} \mu & * \\ x_0 & X \end{bmatrix} \geq 0, \tag{11-b}$$

The foregoing control law is computed as follows:

$$u(t) = -Kx(t) = -ZX^{-1}x(t). \tag{12}$$

By choosing a Lyapunov function candidate of the form $V(x(t))=x^T(t)Px(t)$, the asymptotic stability and $\mathcal{H}_\infty$-norm performance of the considered system are established based on the Lyapunov stability theory.

In that regard, the inequality in (10) implies the following:

$$z^T z - \gamma^2 w^T w < 0, \tag{13}$$

More particularly, a derivative of the $V(x(t))$ is calculated along the trajectories of the closed-loop system (substitute control input from (7) in system (1)) based on the Lyapunov stability theory, and by adding the negative term of (13) and $2\alpha V(x(t))$ for the minimum decary rate of $\alpha$ is as follows:

$$\dot{V}(x(t)) + 2\alpha V(x(t)) + z^T z - \gamma^2 w^T w < 0, \tag{14}$$

after expanding $\dot{V}(x(t))$, and substituting z(t) from (1), the following is obtained:

$$\dot{x}^T(t)Px(t) + x^T(t)P\dot{x}(t) + 2\alpha x^T(t)Px(t) + \tag{15}$$
$$x^T(t)Qx(t) + u^T(t)Ru(t) - \gamma^2 w^T(t)w(t) < 0,$$

and finally, by substituting $\dot{x}(t)$ from (1) and substituting control input from (7), the following is obtained:

$$\left[ x^T(t)(A - B_1 K)^T + w^T(t)B_2^T \right] Px(t) + x^T(t)P[(A - B_1 K)x(t) + B_2 w(t)] + \tag{16}$$
$$2\alpha x^T(t)Px(t) + x^T(t)Qx(t) + x^T(t)K^T RKx(t) - \gamma^2 w^T(t)w(t) < 0,$$

Moreover, by defining the augmented vector $\xi(t)$ as $$\xi(t) \triangleq \begin{bmatrix} x(t) \\ w(t) \end{bmatrix}, \tag{17}$$

Equation (16) as follows $$\xi^T(t)\Omega\xi(t) < 0, \tag{18}$$

-continued where $$\Omega = \begin{bmatrix} (A-B_1K)^TP + P(A-B_1K) + 2\alpha P + Q + K^TRK & * \\ B_2^TP & -\gamma^2 I \end{bmatrix} < 0, \quad (19)$$

Further, for all $\xi(t)\neq 0$ in (18) $\Omega<0$. Moreover, by defining $W=P^{-1}$, and performing a congruence transformation $$\begin{bmatrix} W & 0 \\ 0 & I \end{bmatrix}$$

on the (19), i.e. $\Omega<0$ and then applying the Schur complement formula, LMI (20) is obtained. (Congruence transformation $$\begin{bmatrix} W & 0 \\ 0 & I \end{bmatrix}$$

on $\Omega<0$ means that $$\begin{bmatrix} W & 0 \\ 0 & I \end{bmatrix}$$

is multiplied to left of the $\Omega$ and $$\begin{bmatrix} W^T & 0 \\ 0 & I \end{bmatrix}$$

is multiplied to the right of the $\Omega$ in (19)).

$$\begin{bmatrix} W(A-B_1K)^T + (A-B_1K)W + 2\alpha W & * & * & * \\ B_{2,i}^T & -\gamma^2 I & * & * \\ W & 0 & -Q^{-1} & * \\ -KW & 0 & 0 & -R^{-1} \end{bmatrix} < 0, \quad (20)$$

Finally, by multiplying both sides of the inequality (20) by $\mu$ and considering $X=\mu W$, and $Z=-KX$, the following equation is obtained:

$$\begin{bmatrix} AX + XA^T + B_1Z + B_1^TZ^T + 2\alpha X & * & * & * \\ \mu B_2^T & -\mu\gamma^2 I & * & * \\ X & 0 & -\mu Q^{-1} & * \\ Z & 0 & 0 & -\mu R^{-1} \end{bmatrix} < 0, \quad (21)$$

Next, if (11-a) is multiplied by $\lambda_i \geq 0$ and sum over all $i=1, \ldots, N$ (5), LMI (21) is obtained.

Moreover, for the second LMI (11-b), the cost function (8) is considered and the following is defined:

$$V(x(\infty)) - V(x(0)) + \int_0^\infty x^T(t)(Q + K^TRK)x(t)dt < 0. \quad (22)$$

For the asymptotic stable system $x(\infty) \to 0$, so by considering the utilized Lyapunov function candidate and considering u as an upper bound of the cost function (output energy of the system), the following is obtained:

$$J = \int_0^\infty x^T(t)(Q + K^TRK)x(t)dt < V(x(0)) = x^T(0)Px(0) \leq \mu, \quad (23)$$

Finally, by considering $x^T(0)Px(0)\leq\mu$, and performing the Schur complement and using $W=P^{-1}$, (11-b) is obtained.

In some embodiments, a borehole propagation model is inputted to the linear matrix inequalities based linear quadratic regulator controller to determine the one or more steering commands. In one or more of such embodiments, a reduced order wellbore propagation model is utilized to describe the directional response of the drilling tool (inclination and azimuthal dynamics):

$$\dot{x}(t) = \underbrace{\begin{bmatrix} -\frac{1}{\tau} & 0 \\ 1 & 0 \end{bmatrix}}_{A} x(t) + \underbrace{\begin{bmatrix} \frac{K}{\tau} \\ 0 \end{bmatrix}}_{B_1} u(t) + \underbrace{\begin{bmatrix} \frac{K_{bias}}{\tau} \\ 0 \end{bmatrix}}_{B_2} w(t) \quad (24)$$

In some embodiments, the model-based controller is configured with the wellbore propagation model that characterizes the tool's response dynamics. The model-based controller is configured with other model representations and is not limited to the example wellbore propagation model (24). Without loss of generality, the wellbore propagation model representation (24) is in depth domain. (may replace t with s in equation (24)).

In some embodiments, in equation (24), the dynamic model explains both inclination and azimuthal dynamics. $\tau$ denotes the time/depth constant of the dynamics in seconds or ft, K is the maximum curvature generation capability of the drilling tool (in inclination or azimuth planes) in deg/sec or deg/100 ft. $K_{bias}$ (in deg/sec or deg/100 ft) is the bias term that affects borehole propagation (for example, in inclination plane, it is due to gravity effect etc.). In equation (24), the system state vector denoted as $$x(t) = \begin{bmatrix} \kappa_\theta \\ \theta \end{bmatrix} \text{ or } x(t) = \begin{bmatrix} \kappa_\phi \\ \phi \end{bmatrix},$$

for inclination and azimuthal dynamics respectively, where $\theta$ and $\phi$ are the wellbore inclination and azimuth in degrees, $\kappa_\theta = \dot{\theta}$ and $\kappa_\phi = \dot{\phi}$ are the inclination variation rate (build/drop rate) and azimuth change rate (walk/turn rate) in deg/sec or deg/100 ft, respectively. The control input of the wellbore propagation model is represented by u(t), where $u=u_\theta$, $u_\phi \in [-1, 1]$ in inclination or azimuth planes, respectively. w(t) represents unmodeled dynamics, uncertainties, bias or disturbances from formations. The disturbance term captures known dynamical bias such as formation push and gravity effects. The disturbance term is configured based on domain knowledge and (quasi) real time data.

In some embodiments, model parameters $\tau$, K, and $K_{bias}$ of the wellbore propagation model depend on factors including, but not limited to, the BHA configuration, formation properties, and drilling operation parameters measurements. For example, model parameters for a wellbore propagation model for a BHA with a first drill bit drilling in a first formation will differ from the model parameters for a BHA with a second drill bit in a second formation. Moreover, in some embodiments, model parameters of the wellbore propagation model (1) takes different values in inclination and azimuth planes. The wellbore propagation model (24)

maps the drilling system's input to an output response ("tool's response dynamics"). The model parameters of wellbore propagation model (24) are calibrated based on feedback measurements as drilling proceeds. Calibrating model parameters facilitates the wellbore propagation model (24) to better capture the change in drilling conditions such as the tool's response dynamics or formation properties. In some embodiments, an upper bound and a lower bound of the uncertain model parameter are inputted to the LMI-based RLQR controller to determine the one or more steering commands. In one or more of such embodiments, and in order to facilitate the robust control design (against model parameter uncertainty) a range (with upper/maximum and lower/minimum bounds) for each model parameter is considered as follows:

$$\tau \in [\underline{\tau}, \overline{\tau}], K \in [\underline{K}, \overline{K}], K_{bias} \in [\underline{K}_{bias}, \overline{K}_{bias}] \quad (25)$$

Considering (3) and (4) and the ranges for model parameters (25), by having 3 parameters in the borehole propagation model ($\ell=3$), the associated polytope (including all the variations and uncertainties) will have 8 vertices (N=$2^\ell$=8) as follows:

Vertex 1 ($\underline{\tau}, \underline{K}, \underline{K}_{bias}$):

$$A_1 = \begin{bmatrix} -\frac{1}{\underline{\tau}} & 0 \\ 1 & 0 \end{bmatrix}, B_{1,1} = \begin{bmatrix} \frac{\underline{K}}{\underline{\tau}} \\ 0 \end{bmatrix}, B_{2,1} = \begin{bmatrix} \frac{\underline{K}_{bias}}{\underline{\tau}} \\ 0 \end{bmatrix}$$

Vertex 2 ($\underline{\tau}, \underline{K}, \overline{K}_{bias}$):

$$A_2 = \begin{bmatrix} -\frac{1}{\underline{\tau}} & 0 \\ 1 & 0 \end{bmatrix}, B_{1,2} = \begin{bmatrix} \frac{\underline{K}}{\underline{\tau}} \\ 0 \end{bmatrix}, B_{2,2} = \begin{bmatrix} \frac{\overline{K}_{bias}}{\underline{\tau}} \\ 0 \end{bmatrix}$$

Vertex 3 ($\underline{\tau}, \overline{K}, \underline{K}_{bias}$):

$$A_3 = \begin{bmatrix} -\frac{1}{\underline{\tau}} & 0 \\ 1 & 0 \end{bmatrix}, B_{1,3} = \begin{bmatrix} \frac{\overline{K}}{\underline{\tau}} \\ 0 \end{bmatrix}, B_{2,3} = \begin{bmatrix} \frac{\underline{K}_{bias}}{\underline{\tau}} \\ 0 \end{bmatrix}$$

Vertex 4 ($\overline{\tau}, \underline{K}, \underline{K}_{bias}$):

$$A_4 = \begin{bmatrix} -\frac{1}{\overline{\tau}} & 0 \\ 1 & 0 \end{bmatrix}, B_{1,4} = \begin{bmatrix} \frac{\underline{K}}{\overline{\tau}} \\ 0 \end{bmatrix}, B_{2,4} = \begin{bmatrix} \frac{\underline{K}_{bias}}{\overline{\tau}} \\ 0 \end{bmatrix}$$

Vertex 5 ($\overline{\tau}, \overline{K}, \underline{K}_{bias}$):

$$A_5 = \begin{bmatrix} -\frac{1}{\overline{\tau}} & 0 \\ 1 & 0 \end{bmatrix}, B_{1,5} = \begin{bmatrix} \frac{\overline{K}}{\overline{\tau}} \\ 0 \end{bmatrix}, B_{2,5} = \begin{bmatrix} \frac{\underline{K}_{bias}}{\overline{\tau}} \\ 0 \end{bmatrix}$$

Vertex 6 ($\overline{\tau}, \underline{K}, \overline{K}_{bias}$):

$$A_6 = \begin{bmatrix} -\frac{1}{\overline{\tau}} & 0 \\ 1 & 0 \end{bmatrix}, B_{1,6} = \begin{bmatrix} \frac{\underline{K}}{\overline{\tau}} \\ 0 \end{bmatrix}, B_{2,6} = \begin{bmatrix} \frac{\overline{K}_{bias}}{\overline{\tau}} \\ 0 \end{bmatrix}$$

Vertex 7 ($\underline{\tau}, \overline{K}, \overline{K}_{bias}$):

$$A_7 = \begin{bmatrix} -\frac{1}{\underline{\tau}} & 0 \\ 1 & 0 \end{bmatrix}, B_{1,7} = \begin{bmatrix} \frac{\overline{K}}{\underline{\tau}} \\ 0 \end{bmatrix}, B_{2,7} = \begin{bmatrix} \frac{\overline{K}_{bias}}{\underline{\tau}} \\ 0 \end{bmatrix}$$

Vertex 8 ($\overline{\tau}, \overline{K}, \overline{K}_{bias}$):

$$A_8 = \begin{bmatrix} -\frac{1}{\overline{\tau}} & 0 \\ 1 & 0 \end{bmatrix}, B_{1,8} = \begin{bmatrix} \frac{\overline{K}}{\overline{\tau}} \\ 0 \end{bmatrix}, B_{2,8} = \begin{bmatrix} \frac{\overline{K}_{bias}}{\overline{\tau}} \\ 0 \end{bmatrix} \quad (26)$$

The system state vector denoted as $$x(t) = \begin{bmatrix} \kappa_\theta \\ \theta \end{bmatrix} \text{ or } x(t) = \begin{bmatrix} \kappa_\phi \\ \phi \end{bmatrix},$$

for inclination and azimuthal dynamics respectively, where $\theta$ and $\phi$ are the wellbore inclination and azimuth in degrees, $\kappa_\theta = \dot{\theta}$ and $\kappa_\phi = \dot{\phi}$ are the inclination variation rate (build/drop rate) and azimuth change rate (walk/turn rate) in deg/sec or deg/100 ft, respectively. Moreover, in order to implement the proposed RLQR control design approach (regulator), the integral of the curvature error, $\zeta(t) = \int \kappa_{set} - \kappa$ is augmented into the system state vector to facilitate the RLQR controller to track the arbitrary non-zero curvature reference commands (dimension of the system will increase to n=3).

The robust full-state feedback control law of the RLQR controller will be computed based on the procedure explained in previous section and using the results of Theorem 1 and will generate the steering command(s) based on the curvature error and attitude error input into the RLQR controller and the control gain vector selected based on current drilling operation parameters. For further illustration on control design process, by using parameter ranges in (25) and state-space matrices (vertices of the polytope) in (26), and utilizing the results of Theorem 1 (11), the robust control input is computed using (12) and the final obtained RLQR control gain vector, $\hat{K}$, is represented as $\hat{K}=[K_1, K_2, K_I]$. Each control gain of the control gain vector corresponds to a different state parameter considered by the RLQR controller. As an example, a control gain vector includes a control gain for each curvature state, attitude state, and curvature error. The full-state feedback control input is computed as represented below:

$$u(t) = -\hat{K}x_s(t) = -K_1 \cdot \kappa(t) - K_2 \cdot x_2(t) + K_I \cdot \zeta(t), \quad (27)$$

where $\kappa(t)$ is curvature state of the system (build rate, $\kappa_\theta$, in inclination plane dynamics, or walk rate, $\kappa_\phi$, in azimuth plane dynamics), $x_2(t)$ denotes attitude state of the system (inclination $\theta$, or azimuth $\phi$), and $\zeta(t)$ is the integral of curvature error, which is introduced to enable the introduced curvature cruise controller with arbitrary non-zero curvature setpoint tracking capability. As depicted, the control input is computed to account for current system state as represented by the current system state vector $x_s(t)$ which includes the state components/parameters curvature state, attitude state, and curvature error. (8) also shows that the control input accounts for current operating system conditions (i.e., current drilling operation parameters feedback) as expressed by the control gains. (27) provides a control input in the inclination plane (e.g., build rate effort) and a control input in the azimuth plane (e.g., walk rate effort). Examples of control inputs or steering commands include tool face orientation and the duty cycle (steering ratio). The steering commands are communicated to the BHA to carry out the drilling process.

In some embodiments, a determination of whether the control gain is greater than a threshold is made. Further, in some embodiments, in response to a determination that the control gain is above the threshold, predetermined values with respect to the control gain is obtained, and are inputted to the LMI-based RLQR controller to determine the steering commands. In some embodiments, one or more parameters of the LMI-based RLQR controller are calculated based on the predetermined values, and the LMI-based robust RLQR controller is updated based on the calculated parameters. At block S310, one or more steering commands to be implemented are provided for use during a drilling operation.

In some embodiments, the model parameters (and corresponding ranges) corresponding to different drilling operation parameters are estimated in real-time by employing drilling data (MWD, ROP, WOB, etc.). In one or more of such embodiments, the estimated/calibrated model parameters are then used to update/calibrate the mathematical model (presented in equation (1)) of the wellbore propagation process and accordingly to update the developed model-based RLQR controller gains.

In some embodiments, RLQR controller gains have been computed offline for various system operating conditions, and the corresponding controller gains have been put in a gains table for various drilling operation parameters (model parameter ranges and drilling operational parameters etc.). In one or more of such embodiments, and to avoid frequent controller gains switching, intervals are defined for the model parameters for controller gain selection. Moreover, if the system operating condition changes, i.e., it lies out of the previous drilling operation parameters (range), the processor (of the automated drilling system) determines to switch the controller gains corresponding to the current model parameter range. In one or more of such embodiments, the smaller the considered ranges (intervals) are for the model parameters and operational parameters, the more memory are allocated to store the controller gains tuned for different configurations in the gains table.

Figure 4:
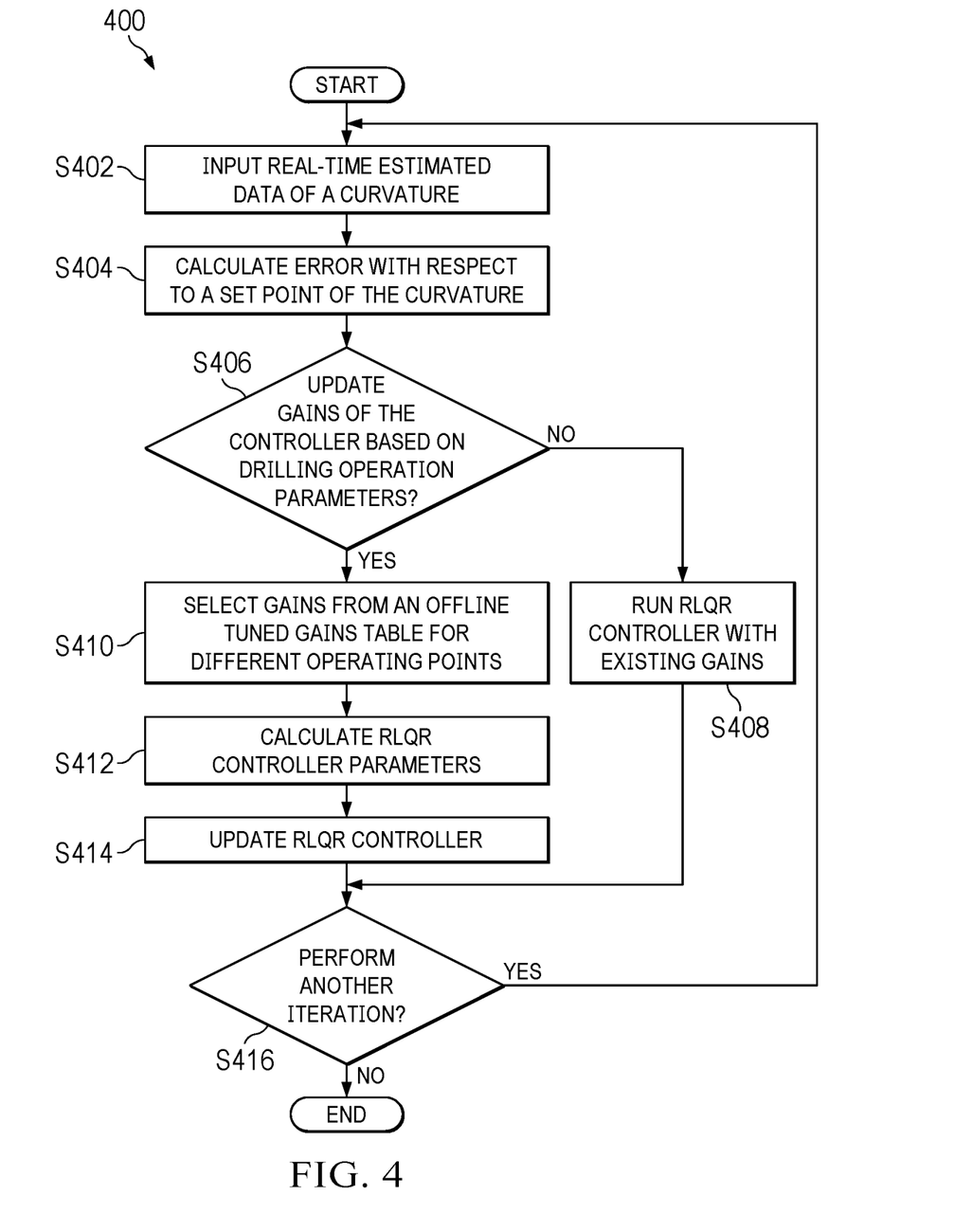
FIG. 4 is a flowchart of another process to perform automated drilling.

The foregoing operations are illustrated in FIG. 4, which is a flowchart of another process 400 to perform automated drilling. Although the operations in process 400 are shown in a particular sequence, certain operations may be performed in different sequences or at the same time where feasible. In some embodiments, process 400 is performed by automated drilling system 122 of FIG. 1.

At block S402, a real time estimated curvature of a wellbore is inputted. At block S404, error with respect to a set point of the curvature is calculated. At block S406, a determination of whether to update gains of the curvature cruise controller based on drilling operation parameters is made. Process 400 then proceeds to block S408 in response to a determination not to update the controller. At block S408, and in response to a determination not to update the controller, the RLQR controller is run with existing gains. Process 400 then proceeds to block S416, and a determination is made whether to perform another iteration.

Alternatively, at block S406, in response to a determination to update gains of the curvature cruise controller, process 400 proceeds to block S410, and gains are selected from an offline tuned gains table for different drilling operation parameters. In some embodiments, the curvature cruise controller queries the offline tuned gains table with the drilling operation parameters measurements (e.g., WOB and ROP) in the drilling operation parameters feedback to obtain control gains. In one or more of such embodiments, predetermined control gains are stored in a lookup table and indexed or referenced by a combination of values/measurements of drilling operation parameters. For example, if the real-time ROP was 200 feet (ft)/hour and the real-time WOB was 30,000 pounds (lbs.), then a predetermined control gains vector at an ROP of 200 ft/hour and a WOB of 30,000 lbs in the lookup table would be selected. In one or more of such embodiments, control gains are with respect to intervals or ranges of measurements for the drilling operation parameters to avoid frequent controller gain switching. For example, the lookup table correlates control gain vectors with a range of WOB values from 5,000 lbs to 100,000 lbs in 10,000 lbs intervals. If the drilling operation parameters feedback includes a WOB value that falls between the intervals, the curvature cruise controller interpolates the control gains based on the surrounding intervals of the WOB value.

At block S412, RLQR controller parameters are calculated, and at block S414, the RLQR controller is updated, and process 400 proceeds to block S416. At block S416, a determination of whether to perform another iteration of process 400 is made. Process 400 proceeds to block S402 and process 400 is repeated in response to a determination to perform another iteration of process 400. Alternatively, process 400 ends in response to a determination not to perform another iteration of process 400.

Figure 5:
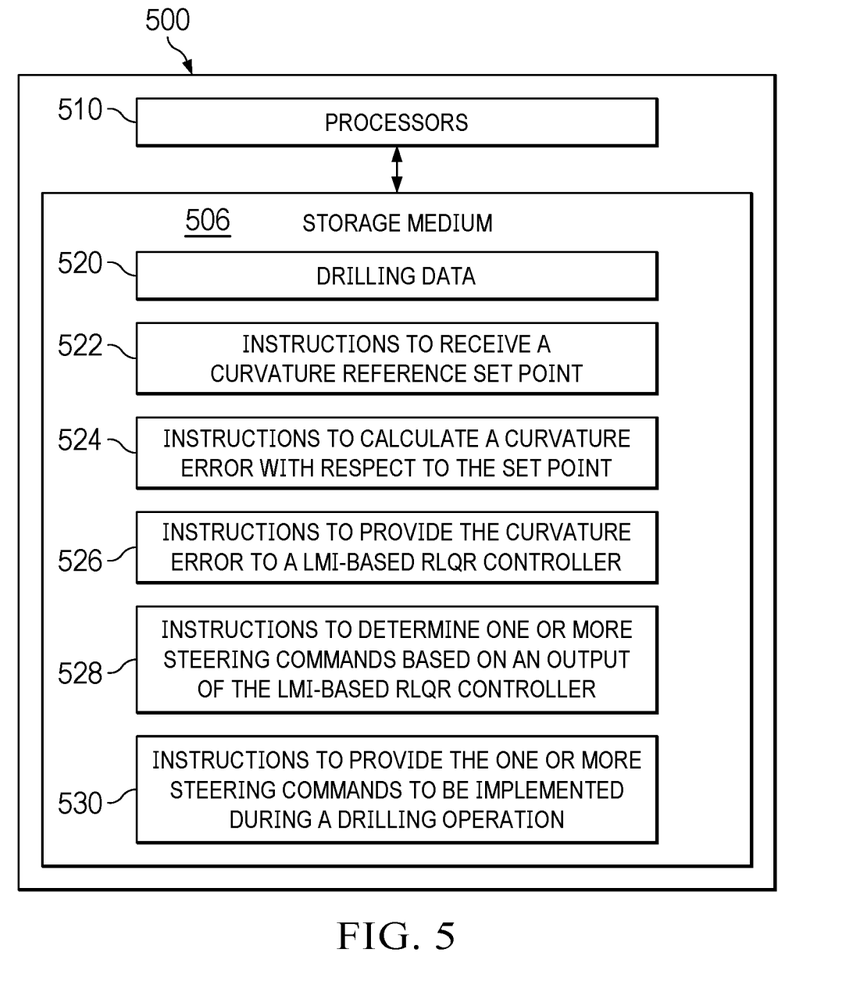
FIG. 5 is a block diagram of the automated drilling system of FIG. 1.

FIG. 5 is a block diagram of automated drilling system 500 similar to automated drilling system 122 of FIG. 1. The automated drilling system 500 includes electronic systems that are configured to perform the operations described herein.

The automated drilling system 500 includes the storage medium 506 and processors 510. The storage medium 506 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 506 includes multiple data storage devices. In further embodiments, the multiple data storage devices may be physically stored at different locations. Data associated with steering systems, bottomhole assemblies, borehole dimensions, and other data utilized to perform automated drilling operations (collectively "drilling data") are stored at a first location 520 of the storage medium. As shown in FIG. 5, instructions to receive a curvature reference set point are stored in a second location 522. Further, instructions to calculate a curvature error with respect to the set point are stored in a third location 524. Further, instructions to provide the curvature error to an LMI-based RLQR controller are stored at a fourth location 526. Further, instructions to determine one or more steering commands to be implemented by a drilling tool based on an output of the LMI-based RLQR controller are stored at a fifth location 528. Further, instructions to provide the one or more steering commands for use during a drilling operation are stored at a sixth location 530. Further additional instructions to perform other operations described herein are stored in other locations of the storage medium 506. In some embodiments, storage medium 506 is stored locally. In some embodiments, storage medium 506 is a remote system, or is a cloud storage system where drilling data and instructions to perform the operations described herein are stored in the cloud. Similarly, in some embodiments some of processors are on the surface or in the cloud, and are configured to perform certain operations on the surface or in the cloud.

Figure 6:
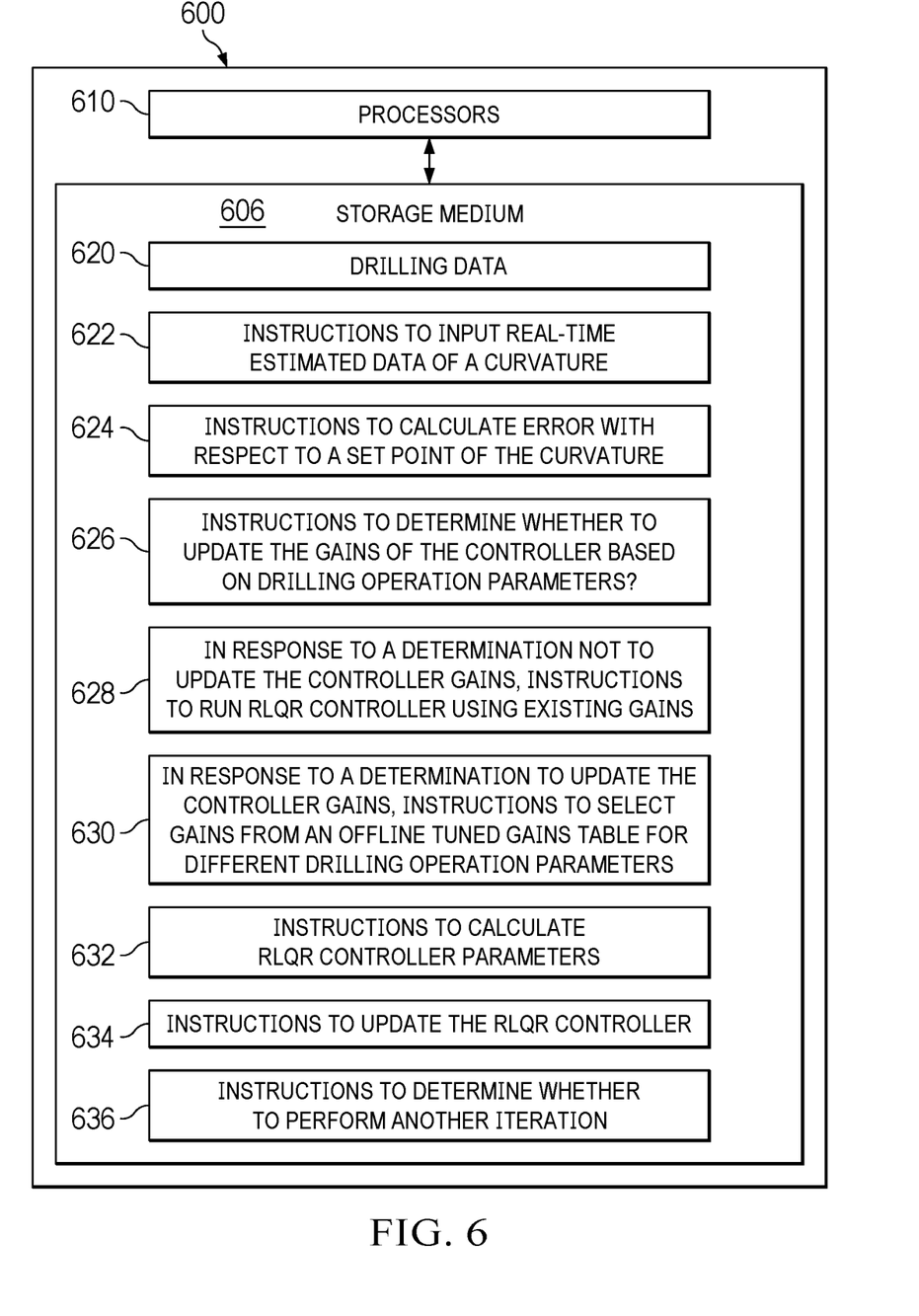
FIG. 6 is another block diagram of the automated drilling system of FIG. 1.

FIG. 6 is another block diagram of automated drilling system 600 similar to automated drilling system 122 of FIG. 1. The automated drilling system 600 includes electronic systems that are configured to perform the operations described herein.

The automated drilling system 600 includes the storage medium 606 and processors 610. The storage medium 606 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 606 includes multiple data storage devices. In further embodiments, the multiple data storage devices may be physically stored at different locations. Drilling data are stored at a first location 620 of the storage medium. As shown in FIG. 6, instructions to input real-time estimated data of a curvature are stored in a second location 622. Further, instructions to calculate error with respect to a set point of the curvature are stored in a third location 624. Further, instructions to determine whether to update the gains of a curvature cruise controller based on drilling operation parameters are stored at a fourth location 626. Further, and in response to a determination not to update the controller gains, instructions to run RLQR controller using existing gains are stored at a fifth location 628. Further, and in response to a determination to update the controller gains, instructions to select gains from an offline tuned gains table for different drilling operation parameters are stored at a sixth location 630. Further, instructions to calculate RLQR controller parameters are stored at a seventh location 632. Further, instructions to update the RLQR controller are stored at an eighth location 634. Further, instructions to determine whether to perform another iteration of the process 400 are stored at a ninth location 636. Further additional instructions to perform other operations described herein are stored in other locations of the storage medium 606. In some embodiments, storage medium 606 is stored locally. In some embodiments, storage medium 606 is a remote system, or is a cloud storage system where drilling data and instructions to perform the operations described herein are stored in the cloud. Similarly, in some embodiments some of processors are on the surface or in the cloud, and are configured to perform certain operations on the surface or in the cloud.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method to perform automated drilling, comprising:
   receiving a curvature reference set point;
   calculating a curvature error with respect to the curvature reference set point;
   providing the curvature error to a linear matrix inequalities based robust linear quadratic regulator controller;
   determining one or more steering commands based on an output of the linear matrix inequalities based robust linear quadratic regulator controller; and
   providing the one or more steering commands to be implemented by a drilling tool during a drilling operation in real time.

2. The computer-implemented method of claim 1, further comprising tuning the linear matrix inequalities based robust linear quadratic regulator controller based on one or more drilling operation parameters.

3. The computer-implemented method of claim 1, further comprising inputting a borehole propagation model to the linear matrix inequalities based robust linear quadratic regulator controller.

4. The computer-implemented method of claim 1, further comprising providing an offline-tuned gains table.

5. The computer-implemented method of claim 1, wherein the computer implemented method is performed by a surface-based electronic device.

6. The computer-implemented method of claim 1, wherein the computer implemented method is performed by an electronic device that is deployed downhole.

7. The computer-implemented method of claim 1, wherein one or more operations of the computer implemented method is performed by a surface-based electronic device, and one or more operations of the computer implemented method is performed by an electronic device that is deployed downhole.

8. The computer-implemented method of claim 1, further comprising:
   receiving a feedback of the drilling operation; and
   inputting the feedback to the linear matrix inequalities based robust linear quadratic regulator controller to determine the one or more steering commands.

9. The computer-implemented method of claim 1, further comprising:
   obtaining one or more control gains of the linear matrix inequalities based robust linear quadratic regulator controller based on one or more model parameters; and
   updating the linear matrix inequalities based robust linear quadratic regulator controller.

10. An automated drilling system, comprising:
a machine-readable medium; and
one or more processors to coupled to the machine-readable medium, to execute instructions stored in the machine-readable medium, to:
receive a curvature reference set point;
calculate a curvature error with respect to the curvature reference set point;
provide the curvature error to a linear matrix inequalities based robust linear quadratic regulator controller;
determine one or more steering commands based on an output of the linear matrix inequalities based robust linear quadratic regulator controller; and
provide the one or more steering commands to be implemented by a drilling tool during a drilling operation in real time.

11. The automated drilling system of claim 10, wherein the one or more processors are further configured to input a borehole propagation model to the linear matrix inequalities based robust linear quadratic regulator controller.

12. The automated drilling system of claim 10, wherein the one or more processors are further configured to input an upper bound and a lower bound of an uncertain model parameter to the linear matrix inequalities based robust linear quadratic regulator controller.

13. The automated drilling system of claim 10, wherein the one or more processors are further configured to:
receive a feedback of the drilling operation; and
input the feedback to the linear matrix inequalities based robust linear quadratic regulator controller to determine the one or more steering commands.

14. The automated drilling system of claim 10, wherein the one or more processors are further configured to:
obtain one or more control gains from an offline tuned gains table of the linear matrix inequalities based robust linear quadratic regulator controller based on one or more drilling operation parameters; and
update the linear matrix inequalities based robust linear quadratic regulator controller.

15. The automated drilling system of claim 14, wherein the one or more processors are further configured to tune the linear matrix inequalities based robust linear quadratic regulator controller based on one or more drilling operation parameters.

16. A computer-implemented method to perform automated drilling, comprising:
receiving estimated data of a curvature;
calculating a curvature error with respect to a set point of the curvature;
determining whether to update a gain of a linear matrix inequalities based robust linear quadratic regulator controller based on the curvature error and a drilling operation parameter;
in response to a determination to update a controller gain of the linear matrix inequalities based robust linear quadratic regulator controller, selecting a gain from an offline tuned gains table; and
providing one or more steering commands, the steering commands determined by an output of the linear matrix inequalities based robust linear quadratic regulator controller, to be implemented by a drilling tool during a drilling operation in real time.

17. The computer-implemented method of claim 16, further comprising, in response to a determination not to update the controller gain, running the robust linear quadratic regulator controller on existing controller gains.

18. The computer-implemented method of claim 16, further comprising generating a build rate effort or a walk rate effort for the drilling tool, based on the curvature error.

19. The computer-implemented method of claim 18, further comprising generating a tool face orientation for the drilling tool, based on the build rate effort or the walk rate effort.

20. The computer-implemented method of claim 18, further comprising generating a duty cycle for the drilling tool, based on the build rate effort or the walk rate effort.

* * * * *